United States Patent
Samson et al.

(10) Patent No.: US 6,298,121 B1
(45) Date of Patent: *Oct. 2, 2001

(54) METHOD AND APPARATUS FOR MAKING A VOICE AND/OR DATA CALL OVER A SINGLE ANALOG PHONE LINE USING A MULTI-MODAL DCE

(75) Inventors: Eric Samson, Folsom, CA (US); Barry O'Mahony, Banks; Narjala Bhasker, Portland, both of OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/910,065

(22) Filed: Aug. 12, 1997

Related U.S. Application Data

(63) Continuation of application No. 08/265,455, filed on Jun. 24, 1994, now abandoned.

(51) Int. Cl.[7] .................................................. H04M 11/00
(52) U.S. Cl. ..................................... 379/93.09; 379/93.34; 379/100.15
(58) Field of Search ........................... 375/222; 370/214, 370/493, 494–495, 522, 537; 348/14, 17; 379/90.01, 93.01, 93.05, 93.09, 93.11, 93.17, 93.26–93.37, 100.15, 100.16, 93.08

(56) References Cited

U.S. PATENT DOCUMENTS

| | | |
|---|---|---|
| 2,974,281 | 3/1961 | Feldman. |
| 4,306,116 * | 12/1981 | McClure et al. ................... 379/93.09 |
| 4,435,804 | 3/1984 | Tan ....................................... 370/69.1 |
| 4,442,540 | 4/1984 | Allen ....................................... 381/31 |
| 4,476,559 * | 10/1984 | Brolin et al. ......................... 370/522 |
| 4,512,013 | 4/1985 | Nash et al. .............................. 370/69 |
| 4,644,527 | 2/1987 | Anderson et al. ....................... 370/58 |
| 4,715,059 | 12/1987 | Cooper-Hart et al. ................. 379/53 |

(List continued on next page.)

FOREIGN PATENT DOCUMENTS

| | | | |
|---|---|---|---|
| 0501485 | 2/1992 | (EP) | ............................. H04M/11/06 |
| 2187611 | 2/1987 | (GB) | ............................... H04J/1/00 |

OTHER PUBLICATIONS

"Communications Standard Dictionary", Weik, 1996.*
Technische Rundschau, vol. 84, No. 4, Jan. 24, 1992, Bern CH pp. 36–38, XP247737 Braun "Auf der Schiene: zum Computer Integrated Railroading".
Mitel Corporation Data Sheet for "Data Over Voice Modem", Part#MT8840, issue 3, Dec. 1987.
Schwartz, Jeffrey, "User Deployes Data–Voice System", article appearing in Communication Week, Sep. 28, 1992.
Stockford, Paul, "Voice View Offers Voice and Data Over a Single Analog Line", article appearing in Voice Processing Magazine, Jul. 1992.

*Primary Examiner*—Curtis Kuntz
*Assistant Examiner*—George Eng
(74) *Attorney, Agent, or Firm*—Blakely, Sokoloff, Taylor & Zafman LLP

(57) ABSTRACT

An enhanced micro-controller having multiple operating modes is provided to an otherwise conventional data circuit terminating equipment (DCE). The enhanced micro-controller, responsive to local events as well as local and remote commands, controls the operation of the DCE in one of at least four modes, an idle mode, an analog voice mode, a digital data mode, and a simultaneous voice and data (SVD) mode. As a result of the improved manner in which the micro-controller operates the DCE, users employing the improved DCE may perform voice and data communication using only a single analog-loop telephone line and in a much more user friendly manner.

33 Claims, 9 Drawing Sheets

U.S. PATENT DOCUMENTS

| | | | |
|---|---|---|---|
| 4,757,495 | | 7/1988 | Decker et al. .......................... 370/76 |
| 4,805,208 | * | 2/1989 | Schwartz ................................ 379/93 |
| 4,813,040 | | 3/1989 | Futato .................................. 370/111 |
| 4,932,047 | | 6/1990 | Emmons et al. ....................... 379/53 |
| 4,991,197 | | 2/1991 | Morris ................................... 379/58 |
| 5,086,453 | | 2/1992 | Senoo et al. .......................... 379/93 |
| 5,091,877 | | 2/1992 | Itoh et al. ............................ 395/200 |
| 5,182,762 | | 1/1993 | Shirai et al. ......................... 375/122 |
| 5,200,962 | | 4/1993 | Kao et al. ............................. 371/41 |
| 5,250,940 | | 10/1993 | Valentaten et al. ................. 345/189 |
| 5,283,638 | | 2/1994 | Engberg et al. ...................... 348/14 |
| 5,325,423 | * | 6/1994 | Lewis ..................................... 379/93 |
| 5,359,644 | * | 10/1994 | Tanaka et al. ....................... 379/100 |
| 5,365,576 | | 11/1994 | Tsumura et al. ...................... 379/93 |
| 5,365,577 | * | 11/1994 | Davis et al. ...................... 379/93.09 |
| 5,428,608 | * | 6/1995 | Freeman et al. ...................... 379/90 |
| 5,440,585 | * | 8/1995 | Partridge, III ....................... 375/222 |
| 5,452,289 | * | 9/1995 | Sharma et al. ...................... 370/32.1 |
| 5,463,616 | * | 10/1995 | Kruse et al. .......................... 379/93 |
| 5,537,441 | * | 7/1996 | Bremer et al. .................... 379/93.08 |
| 5,590,406 | * | 12/1996 | Bayley et al. .................... 379/93.26 |
| 5,606,599 | * | 2/1997 | O'Mahony et al. ............. 379/93.34 |
| 5,805,636 | * | 9/1998 | Rao et al. ......................... 379/93.09 |

* cited by examiner

METHOD AND APPARATUS FOR MAKING A VOICE AND/OR DATA CALL OVER A SINGLE ANALOG PHONE LINE USING A MULTI-MODAL DCE

This is a continuation of application Ser. No. 08/265,455, filed Jun. 24, 1994, now abandoned.

BACKGROUND OF THE INVENTION

1. Field of the Invention

The present invention relates to the field of Data Communication. More specifically, the present invention relates to data circuit terminating equipments (DCEs) such as modems for transmitting voice and data over analog-loop telephone lines.

2. Background Information

Current DCEs that support transmission of both voice and data over a single analog-loop telephone line typically implement the support in one of two approaches. Under the first approach, a DCE operates in one of two switchable modes, a voice mode and a data mode, whereas under the second approach, a DCE operates in a single continuous combined voice and data mode.

More specifically, under the first approach, both the call originating and call responding DCEs start out in the voice mode, where analog voice signals are bypassed from the transmitting telephone coupled to one of the DCEs onto the analog-loop telephone line, and similarly from the analog-loop telephone line to the receiving telephone coupled to the other DCE. While the DCEs are in voice mode, no data are transmitted by the DCEs on behalf of data transmitting equipments (DTEs), such as computers, coupled to the DCEs at both end of the connection. To switch into the data mode, one of the DTEs would cause its DCE to transmit a predetermined signal pattern on its behalf. Upon detection of the predetermined signal pattern, the other DCE would acknowledge. If the acknowledgment is received by the initiating DCE within a predetermined time period, the DCEs would jointly establish a data transmission protocol, enter the data mode, and mute the DCE's voice path. The DTEs can now transmit data to each other through their respective DCEs and over the analog-loop telephone line. At the end of data transmission, the DTE that initiated the mode switching would cause its DCE to transmit another predetermined signal pattern on its behalf, return to the voice mode, and unmute the voice path. Likewise, upon detection of this other predetermined signal pattern, the other DCE would also forward the signal to its DTE, return to the voice mode, and unmute the voice path. Voice signals are once again bypassed from the transmitting telephone onto the telephone line, and from the telephone line to the receiving telephone.

Under the second approach, the DCEs always operate in a single continuous combined voice and data mode. The DCEs jointly establish a data transmission protocol at start up. The analog voice signals received from the coupled telephones are digitized by the DCEs or forwarded to the coupled DTEs for digitization. The DCEs transmit the digitized voice signals intermixed with the data received from the coupled DTEs. Conversely, the digitized voice signals received from the analog-loop telephone line are converted back into analog voice signals by the DCEs or forwarded to the coupled DTEs for conversion. The DCEs then forward the analog voice signals to the telephones.

The first approach has the disadvantage that there is no voice communication between the connected parties during data transmission. Thus, DCEs implementing the first approach are really suitable only for applications where voice communication is unnecessary during data transmission or data transmission is merely required intermittently and for short durations.

The second approach has the disadvantage that the DCEs on both ends of the connection must support continuous combined voice and data mode. Therefore, for applications frequently involving "unacquainted" users, an initial phone call using "standalone" telephones directly coupled to another analog-loop telephone line must be made to establish the fact that such continuous combined voice and data call can be made between two DCE coupled telephones. Thus, DCEs implementing the second approach are really suitable only for applications involving primarily "acquainted" users.

With the continuing increase in the capabilities of microprocessor based desktop computers, they are being applied to more and more applications that require simultaneous voice and data communications between two users. A particular example of these applications is personal conferencing where users at different sites cooperate orally and interactively with a shared workspace application on the creation or review of documents. Another example is remote technical support where the support engineers communicate orally with the users as well as interacting remotely with programs executing on the users' systems for diagnostic or demonstration purposes. Due to the disadvantages discussed above, neither types of DCEs serve these applications well. As a result, most users of these applications resort to two telephone lines, with one dedicated for voice communication, and the other dedicated to data communication.

Thus, it is desirable to be able to support voice and data communication between two users over a single analog-loop telephone line in a more flexible and user friendly manner. As will be disclosed in more detail below, the present invention provide for such method and apparatus that advantageously achieves these and other desirable results.

SUMMARY OF THE INVENTION

The present invention advantageously achieves the desired results by providing an otherwise conventional DCE with an enhanced micro-controller having multiple operating modes. The enhanced micro-controller responsive to local events/commands and remote commands, controls the operation of the DCE in one of at least four modes, an idle mode, an analog voice mode, a digital data mode, and a simultaneous voice and data (SVD) mode.

During operation, upon detection of its local telephone going from an "on-hook" condition to an "off-hook" condition, the micro-controller of a DCE places the DCE in the analog voice mode from the idle mode, and operates the DCE accordingly. Under the analog voice mode, the micro-controller causes only analog voice signals to be exchanged with the other DCE at the other end of the connection.

From the analog voice mode, the micro-controller returns the DCE to the idle mode, upon detection of its local telephone being returned to the "on hook" condition, and operates the DCE accordingly. Alternatively, the micro-controller places the DCE in the SVD mode, upon receipt of either a "dial" command from its local DTE, or a predetermined start up signal pattern from the other DCE, and operates the DCE accordingly. Under the SVD mode, the micro-controller causes digitized voice as well as data to be exchanged with the other DCE.

From the SVD mode, the micro-controller returns the DCE to the analog voice mode, upon receipt of either a "hang up" command from its local DTE, or a "data disconnect" command from the other DCE, and operates the DCE accordingly. Alternatively, the micro-controller places the DCE in the digital data mode, upon either detecting its local telephone being returned to the "on hook" condition, or receipt of a "voice disconnect" command from the other DCE, and operates the DCE accordingly. Under the digital data mode, the micro-controller causes only data to be exchanged with the other DCE.

From the digital data mode, the micro-controller returns the DCE to the SVD mode, upon either detecting its local telephone being returned to the "off hook" condition, or receipt of a "voice restart" command from the other DCE, and operates the DCE accordingly. Alternatively, the micro-controller places the DCE in the idle mode, upon receipt of either a "hang up" command from its local DTE or a "data disconnect" from the other DCE.

DETAILED DESCRIPTION

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention.

Figure 1:
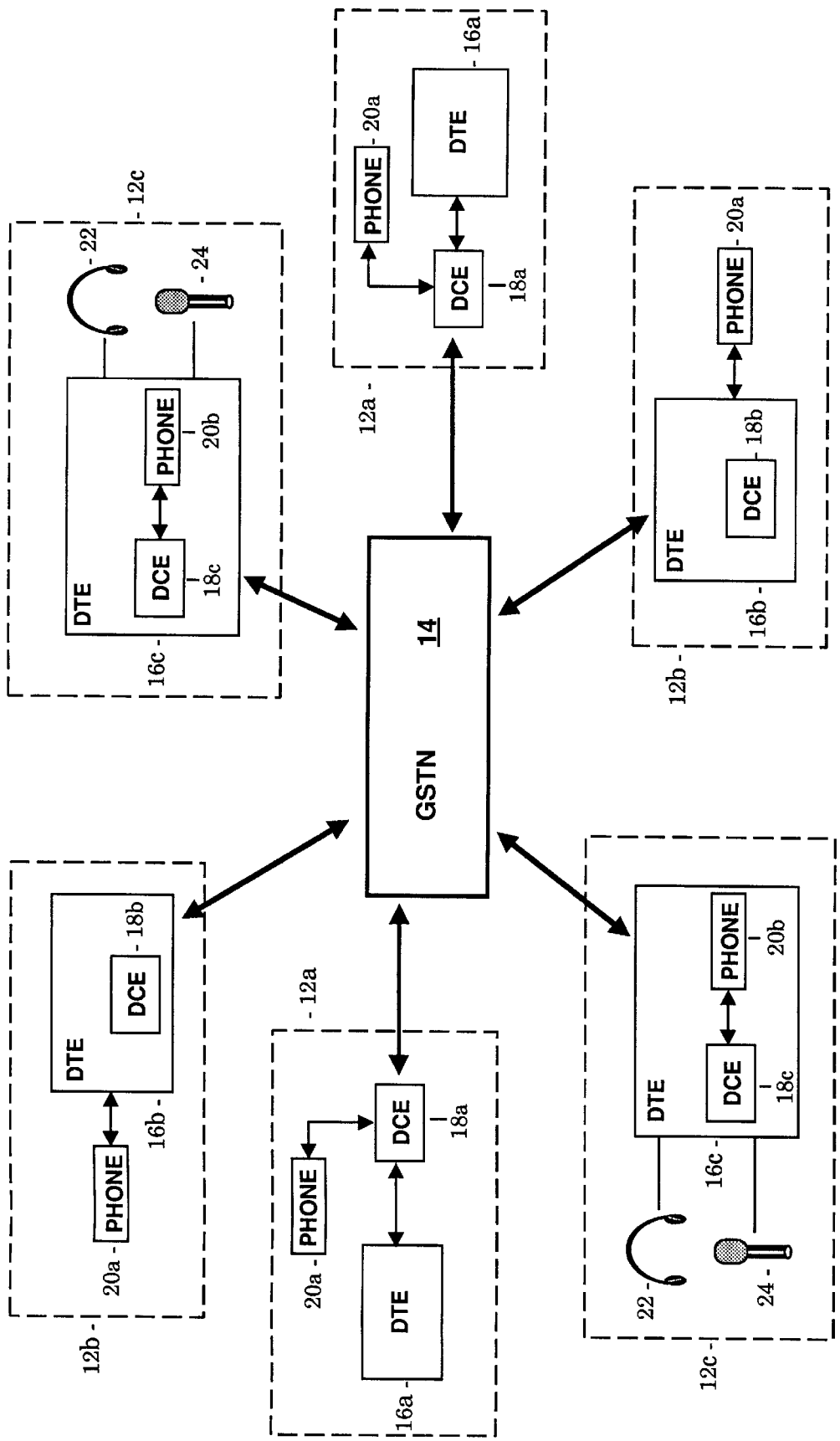
FIG. 1 illustrates a network of user stations having DCEs incorporating the teachings of the present invention.

Referring now to FIG. 1, a block diagram illustrating a network of user stations having DCEs incorporating the teachings of the present invention is shown. Shown are various user stations 12a–12c coupled to each other through a general switched telephone network (GSTN) 14. In one embodiment of the user stations 12a–12c, each user station 12a comprises a DTE 16a, a standalone telephone 20a, and an external DCE 18a incorporating the teachings of the present invention. In an alternate embodiment of the user stations 12a–12c, each user station 12b comprises a standalone telephone 20a and a DTE 16b having internal DCE circuitry 18b incorporating the teachings of the present invention. In yet another embodiment of the user stations 12a–12c, each user station comprises a DTE 16c having internal telephony circuitry 20b as well as DCE circuitry 18c incorporating the teachings of the present invention. Each of these user stations 12c is further equipped with audio input/output capability, such as a headphone 22 and a microphone 24.

The GSTN 14 and the standalone telephones 20a are intended to represent a broad category of these elements found in many telecommunication systems. Their constitutions and functions are well known, and will not be further described.

Figure 2A:
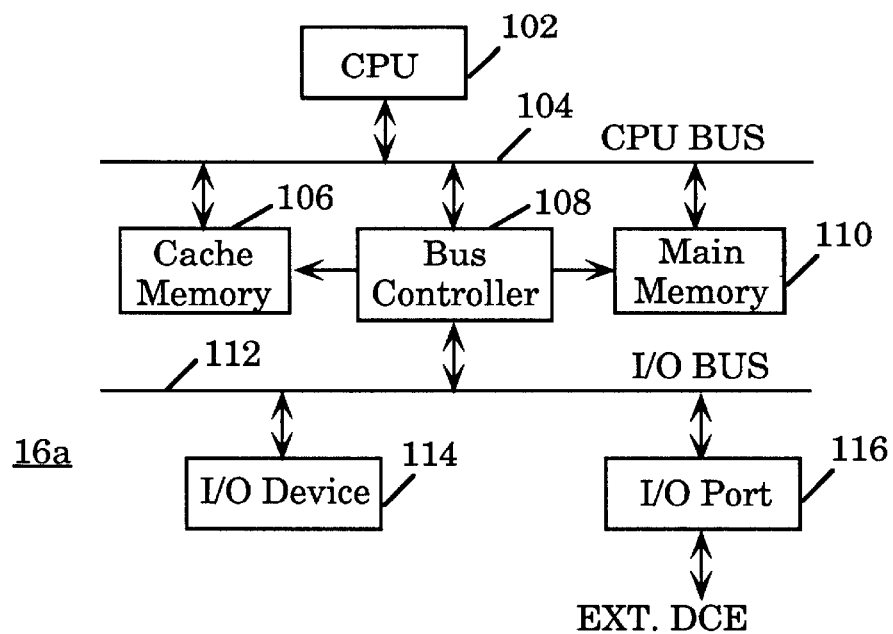
FIGS. 2a–2c illustrate three exemplary embodiments of the DTEs of FIG. 1.
Figure 2B:
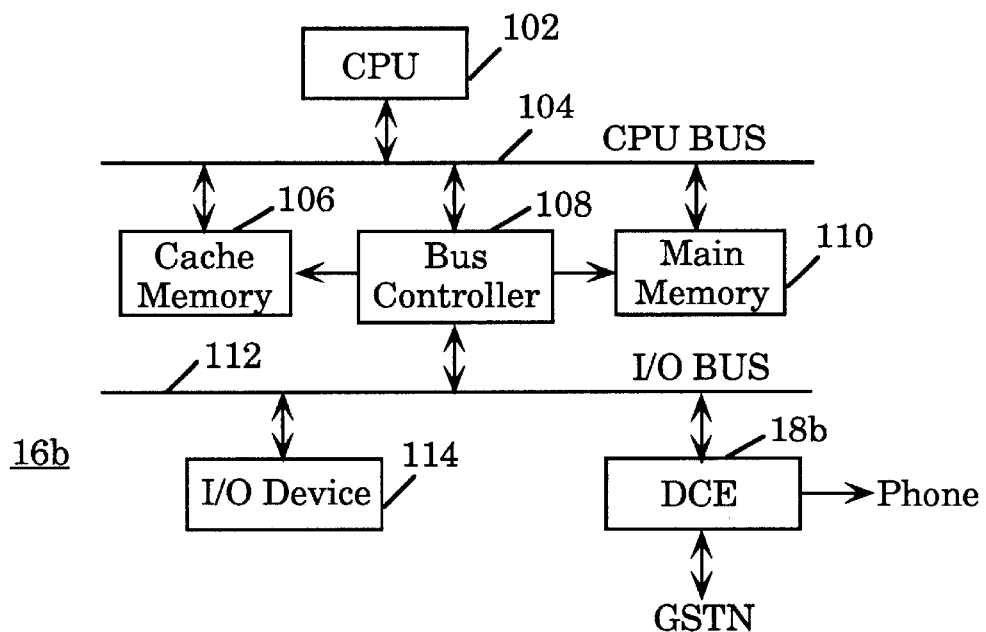
Figure 2C:
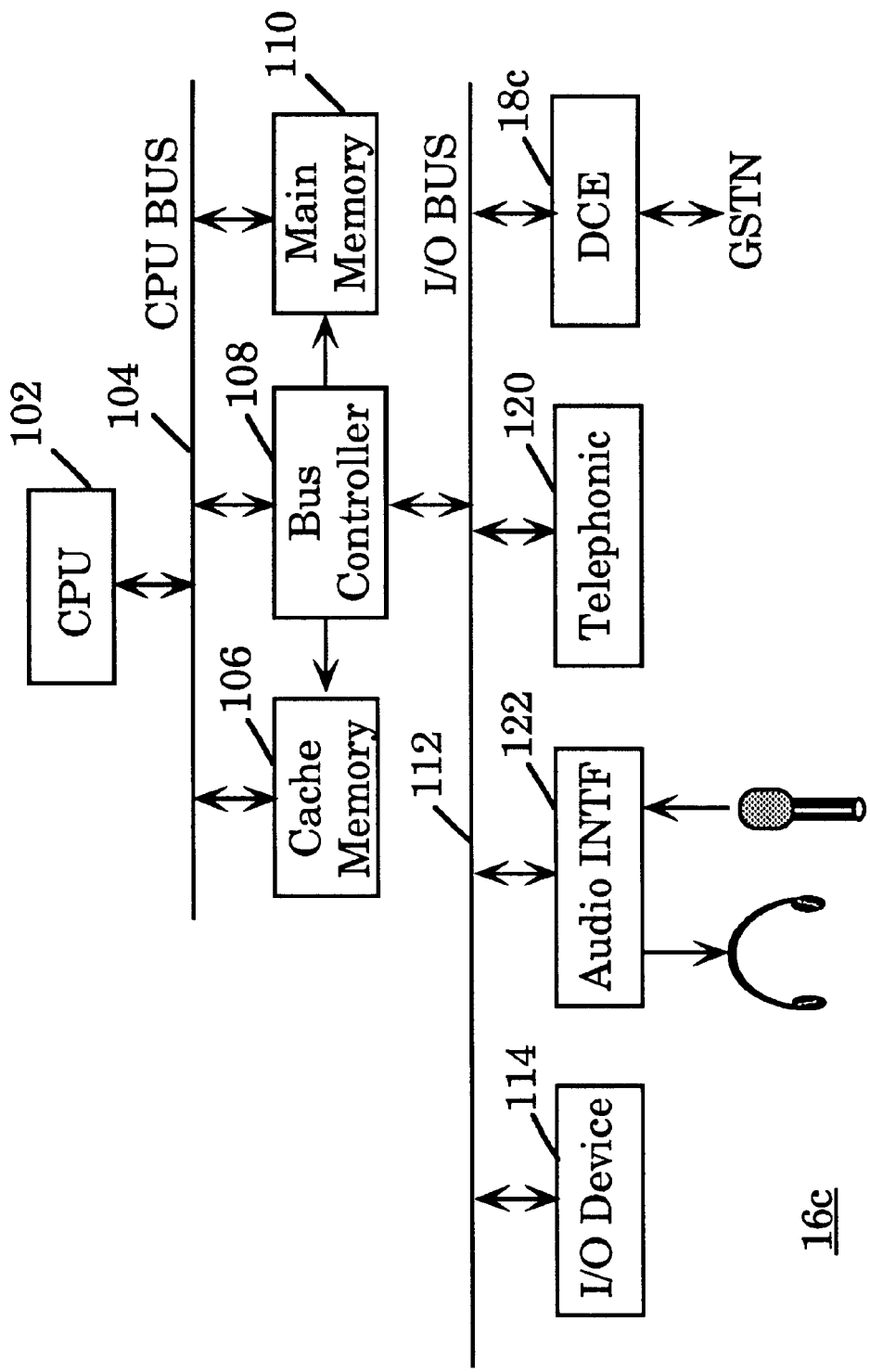

Referring now to FIGS. 2a–2c, three exemplary embodiments of the DTEs of FIG. 1 are illustrated. As illustrated, each illustrated exemplary embodiment of the DTEs 16a–16c comprises a CPU 102, cache and main memory 106 and 108, and I/O devices 114, coupled to each other through the CPU and I/O buses 104 and 112, and the bus controller 108 as shown. Additionally, the first exemplary DTE 16a further comprises an I/O port interface 116 coupled to the I/O bus 112 for interfacing with an external DCE 18a incorporating the teachings of the present invention. The second exemplary DTE 16b further comprises internal DCE circuitry 18b incorporating the teachings of the present invention coupled to the I/O bus 112. The third exemplary DTE 16c further comprises internal audio interface 122, telephony circuitry 20b, and DCE circuitry 18c incorporating the teachings of the present invention, all coupled to the I/O bus 112.

The CPUs 102, the cache and main memory 106 and 110, the I/O devices 114, the buses 104 and 112, the bus controllers 108, the I/O port and audio interfaces 116 and 122, and the telephony circuitry 20b are intended to represent a broad category of these elements found in many computer systems. Their constitutions and functions are well known, and will not be further described.

Referring now to FIGS. 3a–3d, four block diagrams illustrating various embodiments of the DCEs of FIG. 1 are shown. As illustrated, a DCE 18a, 18b', 18b", 18c' or 18c" in accordance to the present invention comprises an enhanced micro-controller 202 incorporating teachings of the present invention. The DCE 18a, 18b', 18b", 18c' or 18c" further comprises a universal asynchronous receiver/transmitter (UART) 201, a data pump digital signal processor 204, data equipment attachment adapter circuitry (DAA) 206, and predetermined start up signal detection circuitry 210.

Additionally, for the first and second embodiments designed to support standalone telephones 20a, the DCE 18a, 18b', or 18b" further comprises enhanced switching circuitry 208, and analog to digital and digital to analog conversion circuitry (CODEC) 212. For these embodiments, the enhanced switching circuitry 208 includes the conventional "loop current detector" for detecting when the standalone telephone 20a goes off hook an starts drawing loop current, whereas the CODEC 212 includes the conventional "local phone interface" for combining the voice signals with the DC voltage for the telephone 20a. The DCE 18a or 18b' further comprises a "local" voice compression/decompression digital signal processor 214, whereas the DCE 18b" further comprises block transfer circuitry 203. The DCE 18b" relies on the processing engine of the DTE for voice compression/decompression. The DCE 18a or 18b' may be packaged as a separate unit from the DTE 16a or an integral part of the DTE 16b, whereas the DCE 18b" is intended to packaged as an integral part of the DTE 16b.

For the third and fourth embodiments designed to support integrated telephony circuitry 20b, the data pump digital signal processor 204 of DCE 18c' or 18c" is further provided with the "CODEC" capabilities. The DCE 18c' or 18c" further comprises block transfer circuitry 203. The DCE 18c' further comprises a "local" voice compression/decompression digital signal processor 214, whereas the DCE 18c" relies on the processing engine of the DTE for voice compression/decompression. Both embodiments of the DCE 18c' or 18c" are intended to be packaged as an integral part of the DTE 16c.

The micro-controller 202, as will be described in more details below, operates the DCE 18a–18c in at least four modes, transitioning the DCE 18a–18c between these operating modes responsive to local events or commands, as well as remote commands as appropriate.

The switching circuitry 208, if used, as well be described also in more details below, responsive to the multi-modal micro-controller 202, dynamically configures signal paths for the signals being received or to be transmitted over a coupled analog-telephone line. The signal paths for the embodiments 18c' and 18c" without the switching circuitry 208 are preconfigured.

The data pump digital signal processor 204 and the voice compression/decompression digital signal processor 214 are intended to represent a broad category of digital signal processors known in the art. Their constitutions and functions are well known, and will not be further described. Preferably, the data pump digital signal processor 204 is a high performance digital signal processor capable of supporting a transmission rate of 14,400 bps or higher, whereas the voice compression/decompression digital signal processor 214 is also a high performance digital signal processor capable of supporting a compression/decompression rate of 9600 bps.

The UART 201, the DAA 206, the CODEC 212, and the start up signal detection circuitry 210 are all intended to represent a broad category of these elements found in many DCEs. Similarly, the block transfer circuitry 203 is intended to represent a broad category of the element found in many computer systems. Their constitutions and functions are well known, and will not be further described.

Figure 3A:
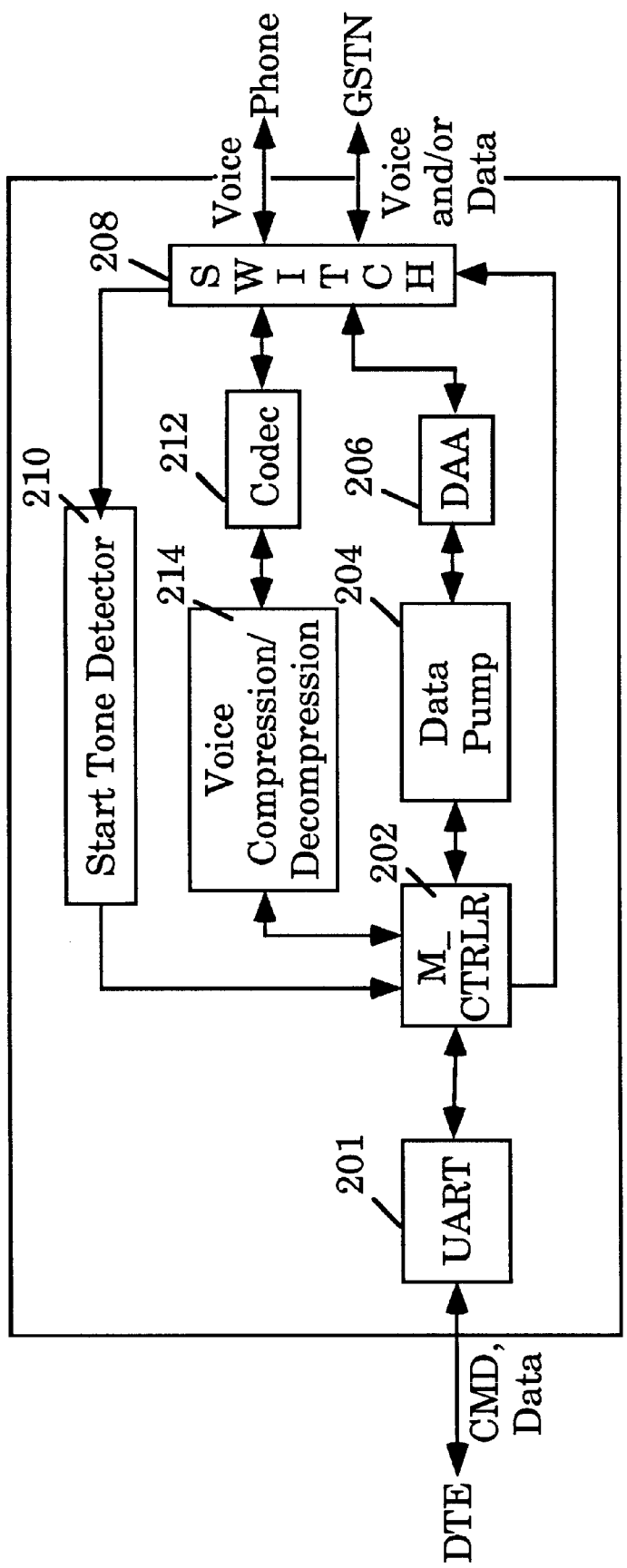
FIGS. 3a–3d illustrate four embodiments of the DCEs of FIG. 1.
Figure 3B:
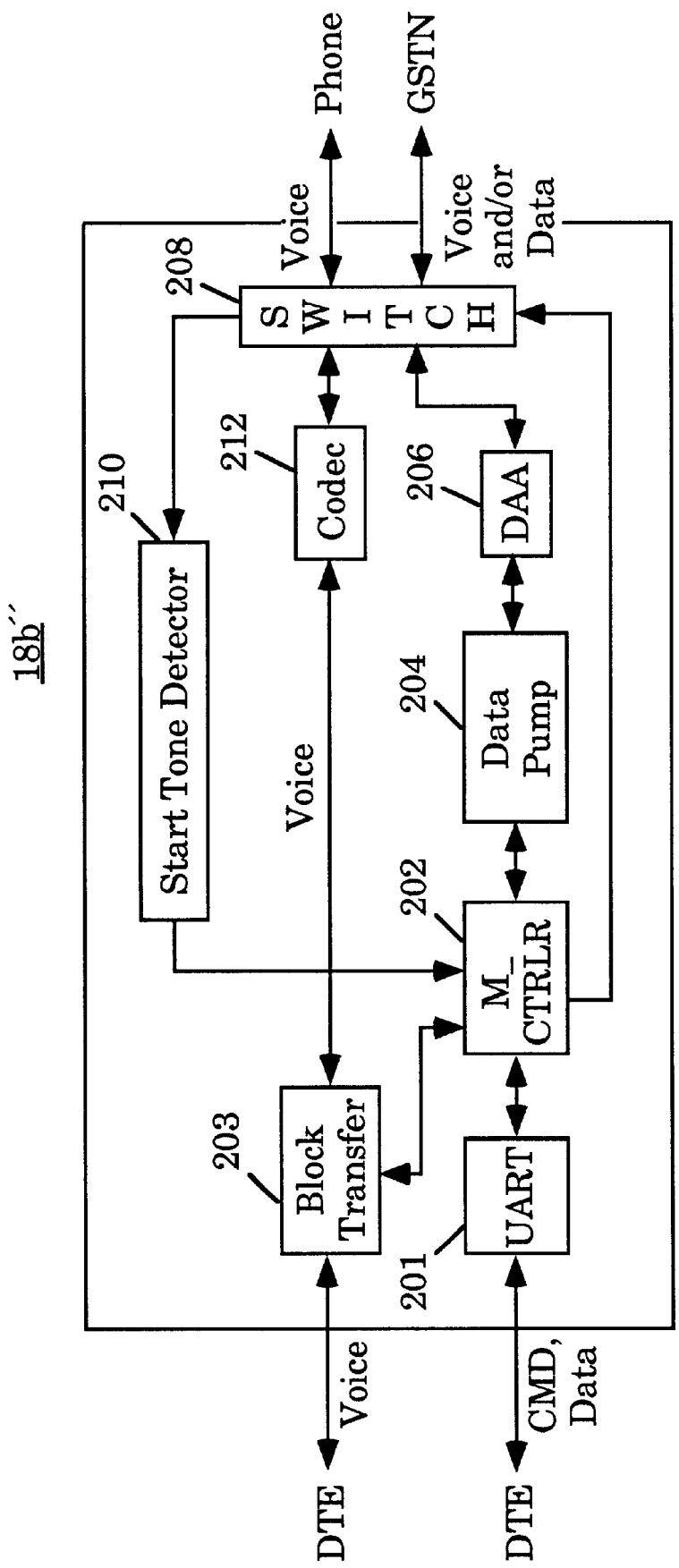
Figure 3C:
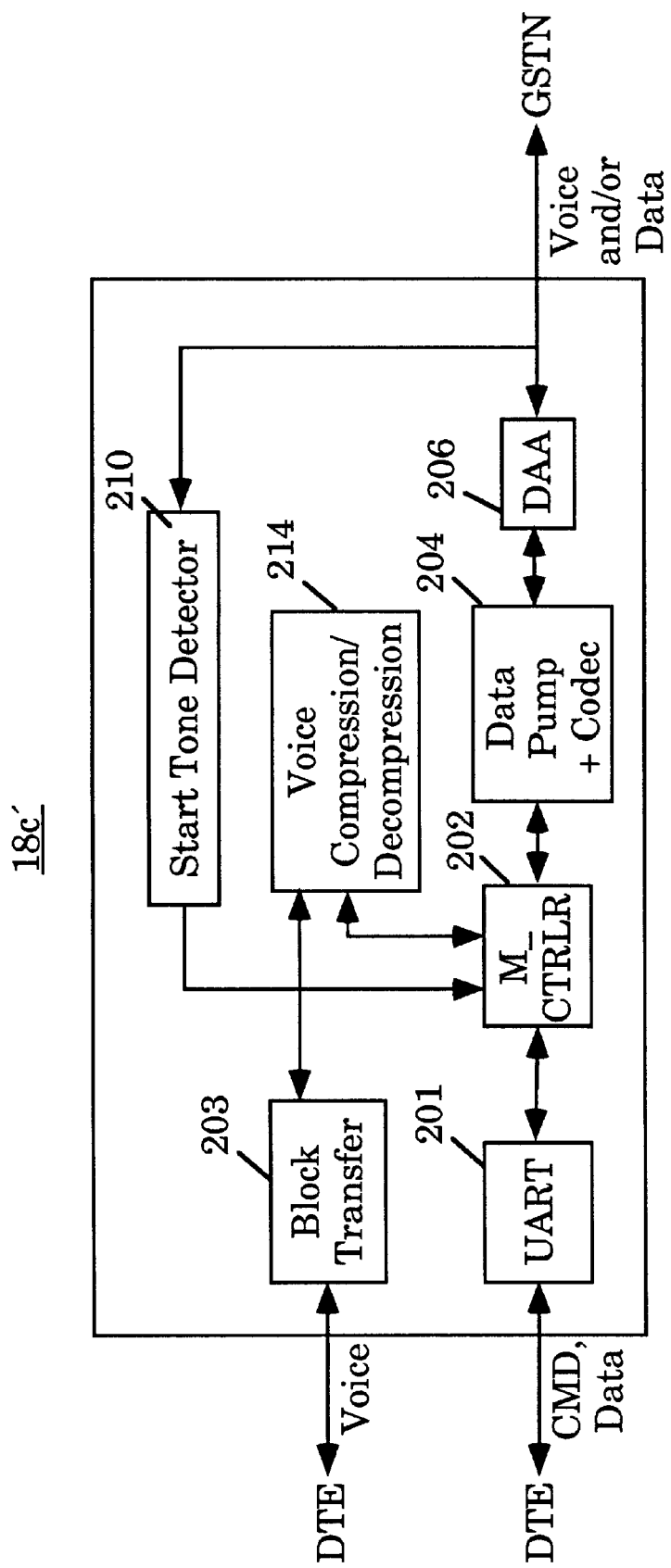
Figure 3D:
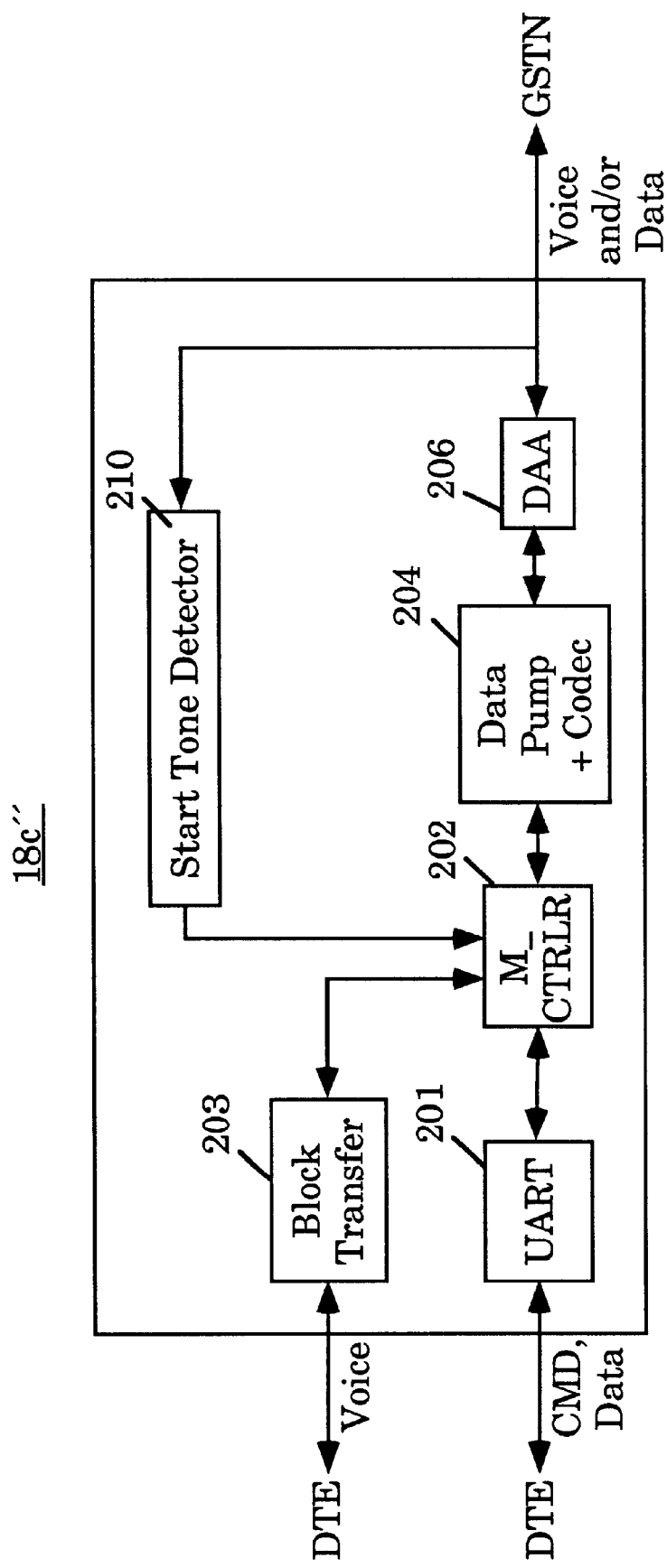
Figure 4A:
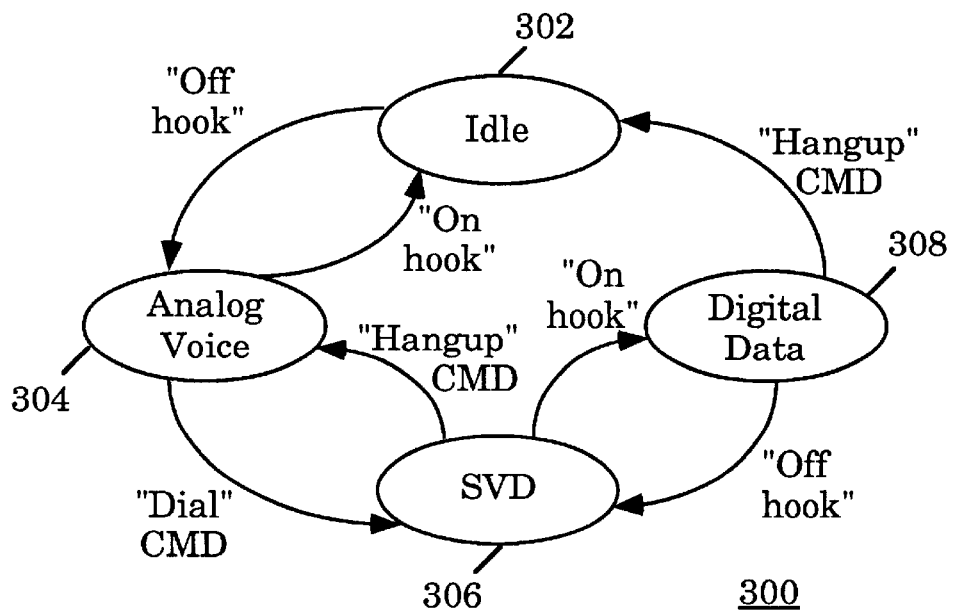
FIGS. 4a–4b illustrate the operating modes and mode transition rules of the enhanced micro-controllers of FIGS. 3a–3d responsive to various local events or commands, and remote commands.
Figure 4B:
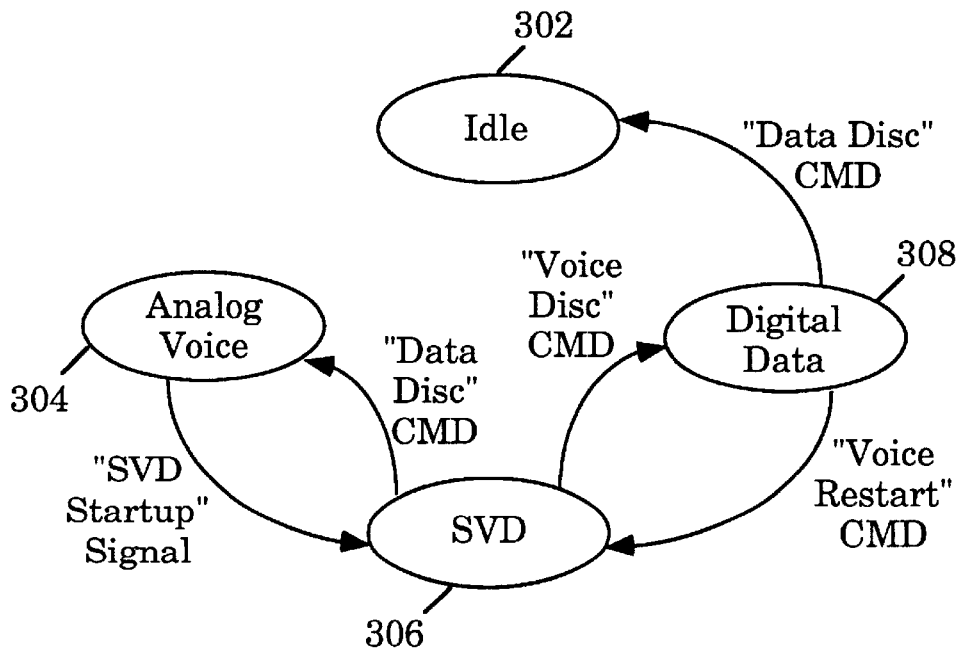

Referring now to FIGS. 4a–4b, two state diagrams illustrating the operating modes of the enhanced micro-controllers of FIGS. 3a–3d responsive to local events/commands or remote commands are shown. As illustrated, the enhanced micro-controller 202 responsive to local events/commands and remote commands, controls the operation of the DCE 18a, 18b, or 18c in one of at least four modes, an idle mode 302, an analog voice mode 304, a digital data mode 308, and a simultaneous voice and data (SVD) mode 306. FIG. 4a illustrates transitions between the various modes 302–308 responsive to local events or commands, whereas FIG. 4b illustrates transitions between the various modes 302–308 responsive to remote commands.

During operation, as illustrated in FIG. 4a, upon detection of its local telephone going from an "on-hook" condition to an "off-hook" condition, the micro-controller 202 of a call originating or a call responding DCE 18a, 18b, or 18c places the DCE 18a, 18b, or 18c in the analog voice mode 304 from the idle mode 302 and operates the DCE 18a, 18b, or 18c accordingly. Under the analog voice mode 304, the micro-controller 202 causes only analog voice signals to be exchanged between the other DCE 18a, 18b, or 18c at the other end of the analog-loop telephone line.

For the embodiments illustrated in FIGS. 3a–3b, the "loop current detector" of the switching circuitry 208 is also used to detect the "on hook" and "off hook" conditions of the local standalone telephone 20a. For the embodiments illustrated in FIGS. 3c–3d, the DTE 16c simulates the "on hook" and "off hook" conditions of the local integrated telephony circuitry 20b.

For the embodiments illustrated in FIGS. 3a–3b, the micro-controller 202 further causes the switching circuitry 208 of the DCE 18a or 18b to provide a direct signal path between the analog-loop phone line and the local standalone telephone 20a. For the embodiments illustrated in FIGS. 3c–3d, the micro-controller 202 further causes the data pump digital signal processor 204 of the DCE 18c to provide "CODEC" function for the outbound and inbound voice signals. For the embodiment illustrated in FIG. 3c, the micro-controller 202 further causes the outbound/inbound voice signals to pass through the compression/decompression digital signal processor 214 without compression/decompression being performed on them, whereas for the embodiment illustrated in FIG. 3d, the micro-controller 202 further cooperates with the DTE 16c to cause the outbound voice signals to be provided in an uncompressed format.

From the analog voice mode 304, the micro-controller 202 of either the call originating or the call responding DCE 18a, 18b, or 18c returns the DCE 18a, 18b, or 18c to the idle mode 302, upon detection of the local telephone being returned to the "on hook" condition from the "off hook" condition; or places the DCE 18a, 18b, or 18c in the SVD mode 306, upon receipt of a "dial" command from the local DTE 16a–16c, and operates the DCE 18a, 18b, or 18c accordingly. Under the SVD mode 306, the micro-controller 202 causes digitized voice as well as data to be exchanged with the other DCE 18a, 18b, or 18c at the other end of the analog-loop telephone connection.

Either the call originating or the call responding DCE 18a, 18b, or 18c may receive the "dial" command from its local DTE 16a–16c. In other words, either the call originating or the call responding DCE 18a, 18b, or 18c may initiate transitioning the call from the analog voice mode to the SVD mode 306. The manner in which the local "dial" command is provided to the mode transition initiating DCE 18a, 18b, or 18c is protocol dependent. For example, under Telecommunication Industry Association (TIA) and Electronic Industry Association (EIA) 602 protocol, the local "dial" command is provided by the "ATD" modem command.

For the embodiments illustrated by FIGS. 3a–3b, the micro-controller 202 further causes the switching circuitry 208 of the DCE 18a or 18b to provide an indirect signal path between the analog-loop phone line and the local standalone telephone 20a, routing the voice signals through the DAA circuitry 206, the data pump 204, the micro-controller 202, either the local voice compression/decompression circuitry digital signal processor 214 or the local DTE 16a or 16b (through the block transfer circuitry 203), and the CODEC 212. For the embodiments illustrated in FIGS. 3c–3d, the micro-controller 202 further causes the data pump digital signal processor 204 of the DCE 18c to skip the "CODEC" function for the outbound and inbound voice signals.

To place the DCE 18a, 18b, or 18c in the SVD mode 306, the DCE 18a, 18b, or 18c confirms with other DCE 18a, 18b, or 18c that it also supports SVD operation. Upon confirmation, the two DCEs 18a, 18b, or 18c jointly establish a multiple logical channel connection between themselves, a protocol for transmitting data and a protocol for transmitting voice. Preferably, the transmission protocol for data is error corrected and compression/decompression algorithms are negotiated for voice as well as for data transmission. Upon establishment of the transmission protocol, the micro-controller 202 then causes voice and data to be transmitted/received interleavingly with the other DCE 18a, 18b, or 18c. Preferably, voice are transmitted without error correction at predetermined desired fixed time intervals, and data are transmitted with error correction in between these time intervals.

For a more detailed description of the confirmation and transmission protocol establishment processes, including voice compression/decompression algorithm negotiations, see U.S. patent application Ser. No. 08/265,314, filed contemporaneously, entitled Method And Apparatus For Automatically Converting from an Analog Voice Mode to a Simultaneous Voice And Data Mode Including Establishment of Transmission Protocols for A Multi-Modal Voice And/Or Data Call over a Single Analog-Loop Telephone Line, which is hereby fully incorporated by reference. For a more detailed description of the interleaving transmission of voice data over a number of logical channels, see U.S. patent application Ser. No. 08/265,326, filed contemporaneously, entitled Method and Apparatus for Multiplexing Voice and Data onto a Single Analog-Loop Telephone Line, which is hereby fully incorporated by reference. The multi-logical channel interleaving transmission described is a frame based protocol transmission.

From the SVD mode 306, the micro-controller 202 either returns the call originating or call responding DCE 18a, 18b, or 18c to the analog voice mode 304, upon receipt of a "hang up" command from the local DTE 16a–16c, and operates the DCE 18a, 18b, or 18c accordingly; or places the call originating or the call responding DCE 18a, 18b, or 18c in the digital data mode 308, upon detecting the local telephone being returned to the "on -hook" condition, and operates the DCE 18a, 18b, or 18c accordingly. Under the digital data mode 308, the micro-controller 202 causes only data to be exchanged with the other DCE 18a, 18b, or 18c at the other end of the analog-loop telephone line connection.

Either the call originating or the call responding DCE 18a, 18b, or 18c may receive the "hang up" command from its local DTE 16a–16c or detect its local telephone going back "on-hook". In other words, either the call originating or the call responding DCE 18a, 18b, or 18c, independent of whether the DCE 18a, 18b, or 18c initiated the transition into the SVD mode 306, may transition the call from the SVD mode 306 back to the analog voice mode 304 or to the digital data mode 308. The manner in which the local "hang up" command is provided to the DCE 18a, 18b, or 18c is also protocol dependent. For example, under TIA/EIA 602, the local "hang up" command is provided by the "ATH" command.

For the embodiments illustrated in FIGS. 3a–3b, the micro-controller 202 further causes the switching circuitry 208 of the DCE 18a, 18b, or 18c to maintain the indirect signal path between the standalone telephone 20a and the analog-loop telephone line.

From the digital data mode 308, the micro-controller 202 either returns the DCE 18a, 18b, or 18c to the SVD mode 306, upon detecting the local telephone being returned to the "off hook" condition, and operates the DCE 18a, 18b, or 18c accordingly; or returns the DCE 18a, 18b, or 18c in the idle mode 302, upon receipt of a "hang up" command from the local DTE 16a–16c.

Either the call originating or the call responding DCE 18a, 18b, or 18c may detect its local telephone going back "off-hook" again or receive the "hang up" command from its local DTE 16a–16c. In other words, either the call originating or the call responding DCE 18a, 18b, or 18c, independent of whether the DCE 18a, 18b, or 18c initiated the transition into the digital data mode 308, may transition the call from the digital data mode 308 back to the SVD mode 306 or to the idle mode 302.

Additionally, during operation, as illustrated in FIG. 4b, from the analog voice mode 304, the micro-controller 202 of either the call originating or the call responding DCE 18a, 18b, or 18c places the DCE 18a, 18b, or 18c in the SVD mode 306, upon detection of receiving a predetermined "start up" signal pattern from the other DCE 18a, 18b, or 18c at the other end of the analog-loop telephone line connection, and operates the DCE 18a, 18b, or 18c accordingly. As described earlier, under the SVD mode 306, the micro-controller 202 causes digitized voice as well as data to be exchanged with the DCE 18a, 18b, or 18c at the other end of the analog-loop telephone line connection.

Since either the call originating or the call responding DCE 18a, 18b, or 18c may initiate transitioning the call into SVD mode, the predetermined "start up" signal pattern receiving DCE 18a, 18b, or 18c may be either the call originating or the call answering DCE 18a 18b, or 18c. The predetermined "start up" signal pattern unambiguously identifies to the mode transition responding DCE 18a, 18b, or 18c, the mode transition initiating DEC's desire to transition the call from the analog voice mode 304 to the SVD mode 306. The predetermined "start up" signal pattern is also protocol dependent. For examples, the predetermined "start up" signal pattern may be defined using International Telecommunication Union-Telecommunication Standardization Sector (ITU-T) Recommendation V.25 or Draft Recommendation V.8 (see the corresponding ITU-T Recommendations for further details). As a further example, the predetermined "start up" signal pattern may be based on Bell Communication Research's (Bellcore) Analog Display Services Interface (ADDS) Customer Premises Equipment (CPE) Alerting Signal (see Bellcore publications TR-NWT-000030 and TR-NWT-001273 for further details).

For the embodiments illustrated in FIGS. 3a–3b, the micro-controller 202 further causes the switching circuitry 208 of the DCE 18a, 18b, or 18c to provide an indirect signal path between the standalone telephone 20a and the analog-loop telephone line.

To place the DCE in the SVD mode 306, as described earlier, the DCE 18a, 18b, or 18c confirms with the other DCE 18a, 18b, or 18c at the other end of the analog-loop telephone line connection that it also supports SVD operation. Upon confirmation, as described earlier, the two DCEs 18a, 18b, or 18c jointly establish a multiple logical channel connection between themselves, a protocol for transmitting data and a protocol for transmitting voice. As described earlier, preferably, the transmission protocols are error corrected and the data as well voice compression/decompression algorithms are negotiated. Upon establishment of the transmission protocol, the micro-controller 202 then causes voice and data to be transmitted/received interleavingly with the other DCE 18a, 18b, or 18c at the other end of the analog-loop telephone line connection.

For a more detailed description of the confirmation and transmission protocol establishment processes, including voice compression/decompression algorithm negotiations, and a more detailed description of the interleaving transmission of voice and data over a number of logical channels, see the above identified and incorporated by reference US Patent Applications.

From the SVD mode 306, the micro-controller 202 of the call originating or the call responding DCE 18a, 18b, or 18c either returns the DCE 18a, 18b, or 18c to the analog voice mode 304, upon receipt of a "data disconnect" command from the other DCE 18a, 18b, or 18c at the other end of the analog-loop telephone line connection, and operates the DCE 18a, 18b, or 18c accordingly; or places the DCE 18a, 18b, or 18c in the digital data mode 308, upon receipt of a "voice disconnect" command from the other DCE 18a, 18b, or 18c, and operates the DCE 18a, 18b, or 18c accordingly. Under the digital data mode 308, as described earlier, the micro-controller 202 causes only data to be exchanged with the DCE 18a, 18b, or 18c at the other end of the analog-loop telephone line connection.

Since either the call originating or the call responding DCE 18a, 18b, or 18c, independent of whether the DCE 18a, 18b, or 18c initiated the transition into the SVD mode 306, may initiate transitioning the call back to the analog voice mode 304 or to the digital data mode 306, the remote "data disconnect" and "voice "disconnect" commands receiving DCE 18a, 18b, or 18c may be either the call originating or the call responding DCE 18a 18b, or 18c. The manners in which the remote "data disconnect" and "voice "disconnect" commands are provided to the DCE 18a, 18b, or 18c are protocol dependent. For example, when using the ITU-T V.42 protocol, the remote "data disconnect" command is provided by a DISC frame with the data link connection identifier (DLCI) set to the data channel, and the remote "voice disconnect" command is provided by a DISC frame with the data link connection identifier (DLCI) set to the voice channel.

For the embodiments illustrated in FIGS. 3a–3b, the micro-controller 202 further causes the switching circuitry 208 of the DCE 18a, 18b, or 18c to maintain the indirect signal path between the standalone telephone 20a, and the analog-loop phone line.

From the digital data mode 308, the micro-controller 202 of either the call originating or the call responding DCE 18a, 18b, or 18c, either returns the DCE 18a, 18b, or 18c to the SVD mode 306, upon receipt of an "voice restart" command from the other DCE 18a, 18b, or 18c, and operates the DCE 18a, 18b, or 18c accordingly; or returns the DCE 18a, 18b, or 18c in the idle mode 302, upon receipt of a "data disconnect" command from the other DCE 18a, 18b, or 18c.

Since either the call originating or the call responding DCE 18a, 18b, or 18c, independent of whether the DCE 18a, 18b, or 18c initiated the transition into the digital data mode 308, may initiate transitioning the call back to the SVD mode 306 or to the idle mode 302, the remote "voice restart" and "data disconnect" commands receiving DCE 18a, 18b, or 18c may be either the call originating or the call responding DCE 18a 18b, or 18c. The manner in which the remote "voice restart" command is provided to the DCE 18a, 18b, or 18c is protocol dependent. For example, when using the ITU-T V.42 protocol, the remote "voice restart" command is provided by a set asynchronous balanced mode extended (SABME) frame with the data link connection identifier (DLCI) set to the voice channel.

Figure 5:
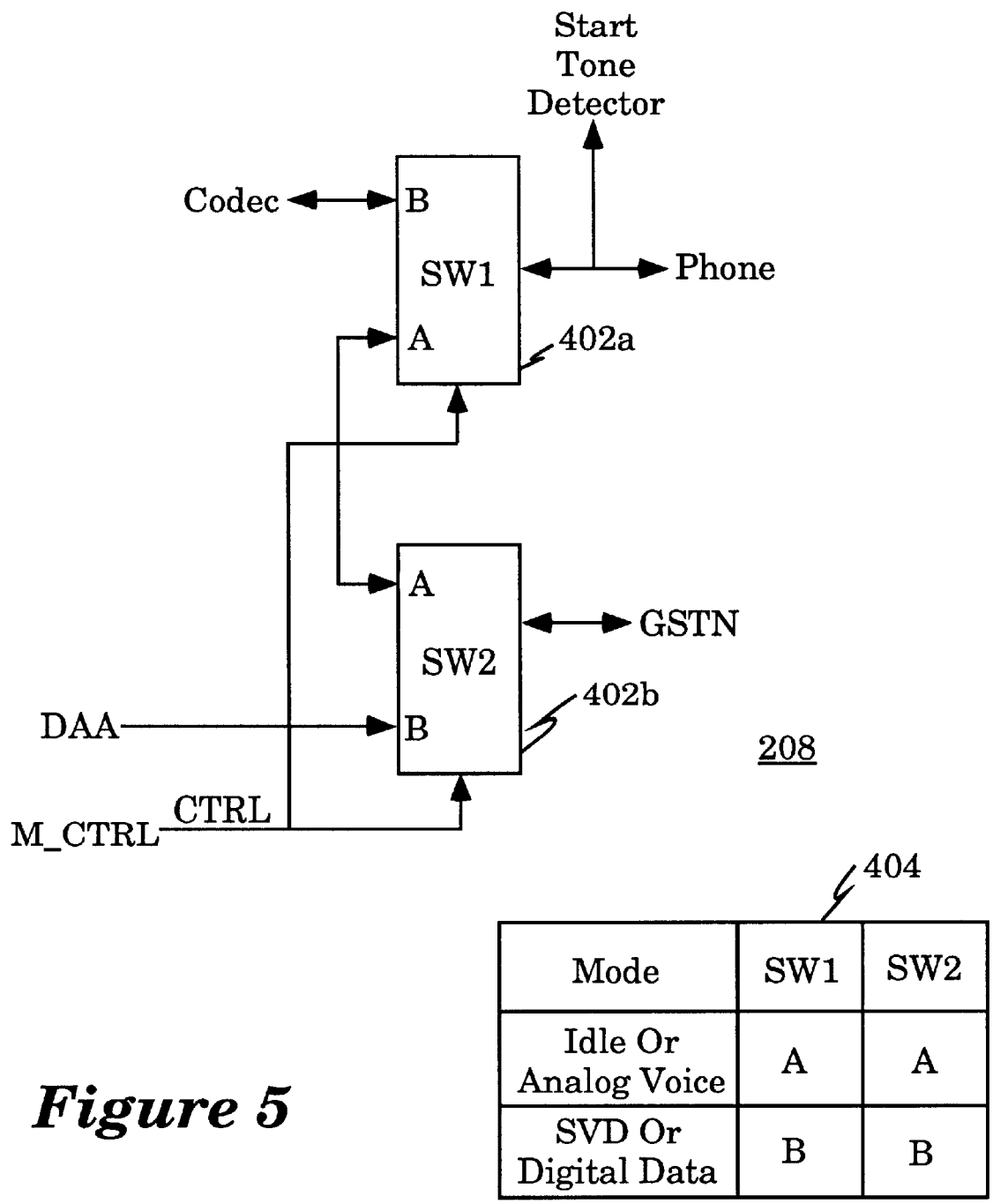
FIG. 5 illustrates one embodiment of the switching circuitry of FIGS. 3a–3b.

Referring now to FIG. 5, a block diagram illustrating one embodiment of the enhanced switching circuitry of FIGS. 3a–3b is shown. In this embodiment, the enhanced switching circuitry 208 comprises two switches (SW1 and SW2) 402a–402b, each switch having two switch positions, coupled to each other as shown. The "loop current detector" (not shown) is located on the path between the SW1 402a and the telephone 20a. The switching circuitry 208 is used by the enhanced micro-controller 202 of the DCE embodiments 18a, 18b' and 18b" to dynamically configure destination and source paths of signals being received and to be transmitted over the coupled analog-loop telephone line. The multi-modal micro-controller 202 sets switches one and two (SW1 and SW2) 402a–402b to one of the two switch positions depending on its operating mode. More specifically, the micro-controller 202 sets switches one and two (SW1 and SW2) 402a–402b to position A if it is operating in the idle or analog voice modes 300–302, otherwise to position B.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. An improved data circuit terminating equipment (DCE-1) for making a call over a single analog-loop telephone line, comprising:

a micro-controller for selectively operating the DCE-1 in different ones of at least three modes by switching on demand during the call, responsive to real time local events or commands as well as real time remote commands, wherein the DCE-1 is in a first idle mode when not transmitting voice and data for the call, and the at least three modes include a second mode where the DCE-1 exchanges only analog voice with another data circuit terminating equipment (DCE-2) at the other end of the analog loop telephone line for the call without provision for exchanging communication data, a third mode where the DCE-1 interleavingly exchanges digitized voice as well as communication data with the DCE-2 for the call supporting simultaneous voice and data (SVD) communication, and a fourth mode where the DCE-1 exchanges digital communication data with the DCE-2 at the other end of the analog-loop telephone line for the call without making allowance for exchanging voice;

said real time local events or commands being events occurring or commands provided in real time by equipment coupled to the DCE-1 at the same end of said analog-loop telephone line, and said real time remote commands being commands provided in real time through the DCE-2 by equipment coupled to the DCE-2 at the other end of said analog-loop telephone line.

2. The DCE-1 as set forth in claim 1, wherein the micro-controller is equipped to place the DCE-1 in the second mode from the first mode to start the call, and cause only analog voice to be exchanged with the DCE-2 for the call, responsive to a real time local telephone going off hook event detected while the micro-controller is in the first mode, said detected local telephone going off hook event being an event occurring in real time at a telephone coupled to the DCE-1 at the same end of said analog-loop telephone line.

3. The DCE-1 as set forth in claim 1, wherein the micro-controller is equipped to return the DCE-1 to the first mode from the second mode to end the call, responsive to a real time local telephone going on hook event detected while the micro-controller is in the second mode exchanging only voice for the call, said detected local telephone going off hook event being an event occurring in real time at a telephone coupled to the DCE-1 at the same end of said analog-loop telephone line.

4. The DCE-1 as set forth in claim 1, wherein the micro-controller is equipped to place the DCE-1 in the third mode from the second mode, and cause communication data as well as voice to be exchanged interleavingly with the DCE-2 for the call, responsive to a real time local dialing command received from a local data terminal equipment (DTE-1) while the micro-controller is in the second mode exchanging only voice for the call, said DTE-1 being a data terminal equipment coupled to the DCE-1 at the same end of said analog-loop telephone line.

5. The DCE-1 as set forth in claim 1, wherein, the micro-controller is equipped to return the DCE-1 to the second mode from the third mode, and cause only analog voice to be exchanged with the DCE-2 for the call, responsive to a real time local hangup command received from a local data terminal equipment (DTE-1) while the micro-controller is in the third mode exchanging communication data as well as voice for the call, said DTE-1 being a data terminal equipment coupled to the DCE-1 at the same end of said analog-loop telephone line.

6. The DCE-1 as set forth in claim 1, wherein the micro-controller is equipped to place the DCE-1 in the fourth mode from the third mode, and cause communication data to be exchanged with the DCE-2 for the call, responsive to a real time local telephone on hook event detected while the micro-controller is in the third mode exchanging communication data as well as voice for the call, said detected local telephone on hook event being an event occurring in real time at a telephone coupled to the DCE-1 at the same end of said analog-loop telephone line.

7. The DCE-1 as set forth in claim 1, wherein, the micro-controller is equipped to place the DCE-1 in the third mode from the fourth mode, and cause voice as well as communication data to be exchanged interleavingly with the DCE-2 for the call, responsive to a real time local telephone off hook event detected while the micro-controller is in the fourth mode exchanging communication data for the call without making allowance for exchanging voice, said detected local telephone off hook event being an event occurring in real time at a telephone coupled to the DCE-1 at the same end of said analog-loop telephone line.

8. The DCE-1 as set forth in claim 1, wherein the micro-controller is equipped to return the DCE-1 to the first mode from the fourth mode to end the call, responsive to a real time local hangup command received from a local data terminal equipment (DTE-1) while the micro-controller is in the fourth mode exchanging communication data for the call without making provisions for exchanging voice, said DTE-1 being a data terminal equipment coupled to the DCE-1 at the same end of said analog-loop telephone line.

9. The DCE-1 as set forth in claim 1, wherein the micro-controller is equipped to place the DCE-1 in the third mode from the second mode, and cause communication data as well as voice to be exchanged interleavingly with the DCE-2 for the call, responsive to a real time remote predetermined start up signal pattern detected while the micro-controller is in the second mode exchanging only voice for the call, said remote predetermined start up signal pattern being provided in real time by the DCE-2 from the other end of said analog-loop telephone line.

10. The DCE-1 as set forth in claim 1, wherein, the micro-controller is equipped to return the DCE-1 to the second mode from the third mode, and cause only analog voice to be exchanged with the DCE-2 for the call, responsive to a real time remote data disconnect command received while the DCE-1 is in the third mode exchanging communication data as well as voice for the call, said remote data disconnect command being provided in real time through the DCE-2 by a remote data terminal equipment (DTE-2) coupled to the DCE-2 at the other end of said analog-loop telephone line.

11. The DCE-1 as set forth in claim 1, wherein the micro-controller is equipped to place the DCE-1 in the fourth mode from the third mode, and cause only communication data to be exchanged with the DCE-2 for the call without making allowance for exchanging voice, responsive to a real time remote voice disconnect command received while the micro-controller is in the third mode exchanging voice as well as communication data for the call, said remote voice disconnect command being provided in real time through the DCE-2 by a remote data terminal equipment (DTE-2) coupled to the DCE-2 at the other end of said analog telephone line.

12. The DCE-1 as set forth in claim 1, wherein, the micro-controller is equipped to place the DCE-1 in the third mode from the fourth mode, and cause voice as well as communication data to be exchanged interleavingly with the DCE-2 for the call, responsive to a real time remote voice restart command received while the micro-controller is in the fourth mode exchanging communication data for the call without making allowance for exchanging voice, said remote voice restart command being provided in real time through the DCE-2 by a remote data terminal equipment (DTE-2) coupled to the DCE-2 at the other end of said analog-loop telephone line.

13. The DCE-1 as set forth in claim 1, wherein the micro-controller is equipped to return the DCE-1 to the first mode from the fourth mode to end the call, responsive to a real time remote data disconnect command received while the micro-controller is in the fourth mode exchanging communication data for the call without making allowance for exchanging voice, said remote data disconnect command being provided in real time through the DCE-2 by a remote data terminal equipment (DTE-2) coupled to the DCE-2 at the other end of said analog-loop telephone line.

14. DCE-1 as set forth in claim 1, wherein the improvement further comprises:
   (b) switching circuitry comprising a plurality of switches for dynamically configuring destination and source paths for voice and data being received and to be transmitted over the single analog-loop telephone line, responsive to the micro-controller.

15. DCE-1 as set forth in claim 14, wherein the micro-controller is equipped to control switch positions of the switches in accordance with the operating modes.

16. The DCE-1 as set forth in claim 14, wherein the improvement further comprises:
   (b) block transfer circuitry for transferring compressed inbound voice signals, decompressed inbound voice signals, uncompressed outbound voice signals, and compressed outbound voice signals between a local data terminal equipment (DTE-1) and the DCE-1 for the call, while the DCE-1 is being operated by the micro-controller in the third mode exchanging voice as well as communication data for the call, said DTE-1 being a data terminal equipment coupled to the DCE-1 at the same end of said analog-loop telephone line.

17. DCE-1 as set forth in claim 1, wherein the improvement further comprises:
   (b) block transfer circuitry for transferring uncompressed inbound and outbound voice signals between a local data terminal equipment (DTE-1) and DCE-1 for the call, while DCE-1 is being operated by the micro-controller in the second mode exchanging only voice for the call, said DTE-1 being a data terminal equipment coupled to DCE-1 at the same end of said analog-loop telephone line.

18. The DCE-1 as set forth in claim 17, wherein the block transfer circuitry is also to be used for transferring decompressed inbound voice signals and uncompressed outbound voice signals between the DTE-1 and the DCE-1 for the call, while the DCE-1 is being operated by the micro-controller in the third mode exchanging communication data as well as voice for the call.

19. The DCE-1 as set forth in claim 17, wherein the block transfer circuitry is also to be used for transferring compressed inbound and outbound voice signals between the DTE-1 and the DCE-1 for the call, while the DCE-1 is being operated by the micro-controller in the third mode exchanging communication data as well as voice for the call.

20. A method for operating a data circuit terminating equipment (DCE-1) to make a call over a single analog-loop telephone line, the method comprising:

a) placing the DCE-1 in a first operating mode where the DCE-1 is idle;

b) placing the DCE-1 in a second operating mode from the first operating mode to start the call, responsive to a real time local telephone off hook event detected while the DCE-1 is operating in the first operating mode, and exchanging analog voice only for the call with another data terminal equipment (DCE-2) at the other end of the analog telephone line, with no provision for exchanging communication data, while the DCE-1 is operating in the second operating mode, said detected local telephone off hook event being an event occurring in real time at a telephone coupled to the DCE-1 at the same end of said analog-loop line;

c) returning the DCE-1 to the first operating mode from the second operating mode to end the call, responsive to a real time local telephone on hook event detected while the DCE-1 is operating in the second operating mode, said detected local telephone line on hook event being an event occurring in real time on said telephone coupled to the DCE-1 at the same end of said analog-loop telephone line;

d) placing the DCE-1 in a third operating mode from the second operating mode, responsive to a real time local dial command received while the DCE-1 is operating in the second operating mode, and interleavingly exchanging digitized voice as well as communication data with the DCE-2 while the DCE-1 is operating in the third operating mode supporting simultaneous voice and data communication (SVD), said local dial command being provided in real time by a data terminal equipment (DTE-1) coupled to the DCE-1 at the same end of said analog-loop telephone line;

e) returning the DCE-1 to the second operating mode from the third operating mode, responsive to a real time local hangup command received while the DCE-1 is operating in the in the third operating mode, and operating the DCE-1 is defined in step (b), said local hangup command being provided in real time by the DTE-1;

f) placing the DCE-1 in a fourth operating mode from the third operating mode, responsive to a real time local telephone on hook event detected while the DCE-1 is operating in the third operating mode, and exchanging only digital communication data for the call with the DCE-2, without making allowance for exchanging voice, while the DCE-1 is operating in the fourth operating mode, said detected local telephone on hook event being an event occurring in real time at said telephone coupled to the DCE-1 at the same end of said analog-loop telephone line;

g) returning the DCE-1 to the third operating mode from the fourth operating mode, responsive to a real time local telephone off hook event detected while the DCE-1 is operating in the fourth operating mode, and operating the DCE-1 as defined in step (d), said detected local telephone off hook event being an event occurring in real time on said telephone coupled to the DCE-1 at the same end of said analog-loop telephone line; and h) placing the DCE-1 in the first operating mode from the fourth operating mode to end the call, responsive to a real time local hangup command received while the DCE-1 is operating in the fourth operating mode, said local hangup command being provided in real time by the DTE-1.

21. The method as set fourth in claim 20, wherein:

step (d) further comprises placing the DCE-1 in the third operating mode from the second operating mode, responsive to a real time remote predetermined start up signal pattern detected while the DCE-1 is operating in the second operating mode, and operating the DCE-1 as defined in step (d), said remote predetermined start up signal pattern being provided in real time by the DCE-2;

step (e) further comprises returning the DCE-1 to the second operating mode, responsive to a real time remote data disconnect command received while the DCE-1 is operating in the third operating mode, and operating the DCE-1 as defined in step (b), said remote data disconnect command being provided in real time through the DCE-2 by a remote data terminal equipment (DTE-2) coupled to the DCE-2 at the other end of said analog-loop telephone line;

step (f) further comprises placing the DCE-1 in the fourth operating mode from the third operating mode, responsive to a real time remote voice disconnect command received while the DCE-1 is operating in the third operating mode, and operating the DCE-1 as defined in step (f), said remote voice disconnect command being provided in real time through the DCE-2 by the DTE-2;

step (g) further comprises returning the DCE-1 to the third operating mode from the fourth operating mode, responsive to a real time remote voice restart command received while the DCE-1 is operating in the fourth operating mode, and operating the DCE-1 as defined in step (d), said remote voice restart command being provided real time through the DCE-2 by the DTE-2; and step (h) further comprises returning the DCE-1 in the first operating mode from the fourth operating mode to end the call, responsive to a real time remote data disconnect command received while the DCE-1 is operating in the fourth operating mode, said remote data disconnect command being provided in real time through the DCE-2 by the DTE-2.

22. A method for operating a data circuit terminating equipment (DCE-1) to make a call over a single analog-loop telephone line, the method comprising:

a) placing the DCE-1 in a first operating mode where the DCE-1 is idle;

b) placing the DCE-1 in a second operating mode from the first operating mode to start the call, responsive to a real time local telephone off hook event detected while the DCE-1 is operating in the first operating mode, and exchanging analog voice only for the call with another data circuit terminating equipment (DCE-2) at the other end of the analog telephone line, with no provision for exchanging communication data, while the DCE-1 is operating in the second operating mode;

c) returning the DCE-1 to the first operating mode from the second operating mode to end the call, responsive to a real time local telephone on hook event detected while the DCE-1 is operating in the second operating mode, said detected local telephone on hook event being an event occurring in real time on a telephone coupled to the DCE-1 at the same end of said analog-loop telephone line;

d) placing the DCE-1 in a third operating mode from the second operating mode, responsive to a remote predetermined start up signal pattern detected in real time while the DCE-1 is operating in the second operating mode, and interleavingly exchanging digitized voice as well as communication data with the DCE-2 for the call while the DCE-1 is operating in the third operating mode supporting simultaneous voice and data (SVD) communication, said remote predetermined start up signal pattern being provided in real time by the DCE-2;

e) returning the DCE-1 to the second operating mode from the third operating mode, responsive to a real time remote data disconnect command received while the DCE-1 is operating in the third operating mode, and operating the DCE-1 as defined in step (b), said remote data disconnect command being provided in real time through the DCE-2 by a remote data terminal equipment (DTE-2), said DTE-2 being coupled to the DCE-2 at the other end of said analog-loop telephone line;

f) placing the DCE-1 in a fourth operating mode from the third operating mode, responsive to a real time remote voice disconnect command received while the DCE-1 is operating in the third operating mode, and exchanging communication data with the DCE-2 for the call, without making allowance for exchanging voice, while the DCE-1 is operating in the fourth operating mode, said remote voice disconnect command being provided in real time through the DCE-2 by the DTE-2;

g) returning the DCE-1 to the third operating mode from the fourth operating mode, responsive to a real time remote voice restart command received while the DCE-1 is operating in the fourth operating mode, and operating the DCE-1 as defined in step (d), said remote voice restart command being provided in real time through the DCE-2 by the DTE-2; and h) placing the DCE-1 in the first operating mode from the fourth operating mode to end the call, responsive to a real time remote data disconnect command received while the DCE-1 is operating in the fourth operating mode, said remote data disconnect command being provided in real time through the DCE-2 by the DTE-2.

23. A computer system comprising:
(a) a processor;
(b) a memory subsystem;
(c) a bus subsystem coupled to the processor and the memory subsystem; and
(d) an internal modem (M1) coupled to the bus subsystem having a micro-controller to operate the M1 in a first idle mode, as well as selectively operate the M1 by switching on demand in different ones of at least three modes for a multi-modal call, responsive to a number of real time local events or commands and a number of real time remote commands received over an analog-loop telephone line, wherein the at least three modes include a second mode where the M1 exchanges only analog voice for the call with another modem (M2) at the other end of the analog-loop telephone line with no provision for exchanging communication data, a third mode where the M1 interleavingly exchanges digitized voice as well as communication data with the M2 supporting simultaneous voice and data (SVD) communication, and a fourth mode where the M1 exchanges communication data for the call with the M2 without making allowance for exchanging voice, said real time local events or commands being events occurring or commands provided in real time by equipment coupled to the M1 at the same end of said analog-loop telephone line, and real time remote commands being commands provided in real time by equipment coupled to the M2 at the other end of said analog-loop telephone line.

24. The computer system as set forth in claim 23, wherein the M1 is further equipped with switching circuitry for dynamically configuring destination and source paths for voice and data being received and to be transmitted over the single analog-loop telephone line responsive to the micro-controller.

25. The computer system as set forth in claim 24, wherein the switching circuitry is further equipped to connect a standalone telephone to the M1.

26. The computer system as set forth in claim 23, wherein:
the computer system further comprises internal telephonic circuitry coupled to the bus subsystem; and
the M1 is further equipped with block transfer circuitry for transferring compressed inbound voice signals, decompressed inbound voice signals, uncompressed outbound voice signals, and compressed outbound voice signals between the telephonic circuitry and the M1, while the M1 is being operated by the micro-controller in the third mode for the call.

27. The computer system as set forth in claim 23, wherein:
the computer system further comprises internal telephonic circuitry coupled to the bus subsystem; and
the M1 is further equipped with block transfer circuitry for transferring uncompressed inbound and outbound voice signals between the telephonic circuitry and the M1, while the M1 is being operated by the micro-controller in the second mode for the call.

28. The computer system as set forth in claim 27, wherein, the block transfer circuitry is also to be used for transferring decompressed inbound voice signals between the telephonic circuitry and the M1, while the M1 is being operated by the micro-controller in the third mode for the call.

29. The computer system as set forth in claim 27, wherein, the block transfer circuitry is also to be used for transferring compressed inbound and outbound voice signals between the telephone circuitry and the M1, while the M1 is being operated by the micro-controller in the third mode for the call.

30. A data and voice communication system comprising;
a) a computer having an I/O interface;
b) a standalone telephone; and
c) an external modem (M1) equipped to couple the M1 itself to the I/O interface, the standalone telephone, and an analog-loop telephone line, the M1 having a micro-controller to operate the M1 in a first idle mode, as well as selectively operate the M1 by switching on demand in different ones of at least three modes for a call, responsive to a real time number of local events of the telephone, a number of real time local commands of the computer, and a number of real time remote commands received over an analog-loop telephone line, wherein the at least three modes include a second mode where the M1 exchanges only analog voice for the call with another modem M2 at the other end of the analog-loop telephone line without provision for exchanging communication data, a third mode where the modem interleavingly exchanges digitized voice as well as communication data with the M2 supporting simultaneous voice and data (SVD) communication, and a fourth mode where the M1 exchanges communication data for the call with the M2 without making allowance for exchanging voice.

31. The data and voice communication system as set forth in claim 30, wherein the M1 is further equipped with switching circuitry for dynamically configuring destination and source paths for voice and data being received and to be transmitted over the single analog-loop telephone line responsive to the micro-controller.

32. A data and voice communication system comprising:
   a) a standalone telephone; and
   b) a computer having an internal modem (M1) coupled to the standalone telephone and a single analog-loop telephone line, the M1 having
      b.1) a micro-controller responsive to real time local events of said standalone telephone as well as real time local and remote commands to operate the M1 in a first idle mode, as well as selectively operate the M1 by switching on demand in different ones of at least three modes for a call, wherein the at least three modes include a second mode where the M1 exchanges only analog voice for the call with another modem (M2) at the other end of the analog-loop telephone line without provision for exchanging communication data, a third mode where the M1 interleavingly exchanges digitized voice as well as communication data with the M2 supporting simultaneous voice and data (SVD) communication, and a fourth mode where the M1 exchanges communication data for the call with the M2 without making allowance for exchanging voice, said real time local commands being provided in real time by equipment coupled to the M1 at the same end of said analog-loop telephone line, and said real time remote commands being commands provided in real time through the M2 by a computer coupled to the M2 or having the M2 at the other end of said analog-loop telephone line, and
      b.2) switching circuitry responsive to the micro-controller for dynamically configuring destination and source paths for voice and data being received and to be transmitted over the single analog-loop telephone line.

33. The data and voice communication system as set forth in claim 32, wherein the M1 is further equipped with switching circuitry for dynamically configuring destination and source paths for voice and data being received and to be transmitted over the single analog-loop telephone line responsive to the micro-controller.

* * * * *

UNITED STATES PATENT AND TRADEMARK OFFICE
CERTIFICATE OF CORRECTION

PATENT NO. : 6,298,121 B1
DATED : October 2, 2001
INVENTOR(S) : Samson et al.

It is certified that error appears in the above-identified patent and that said Letters Patent is hereby corrected as shown below:

<u>Title page, Item [54] and Column 1, line 3,</u>
Delete "ANALOG" and insert -- ANALOG-LOOP --.

Signed and Sealed this

Twenty-seventh Day of August, 2002

Attest:

Attesting Officer

JAMES E. ROGAN
*Director of the United States Patent and Trademark Office*